Dec. 29, 1959 J. F. CLEARMAN 2,918,927
TRANSFER VALVE

Filed May 10, 1956 2 Sheets-Sheet 1

INVENTOR.
JACK F. CLEARMAN
BY
ATTORNEYS

Dec. 29, 1959  J. F. CLEARMAN  2,918,927
TRANSFER VALVE
Filed May 10, 1956  2 Sheets-Sheet 2
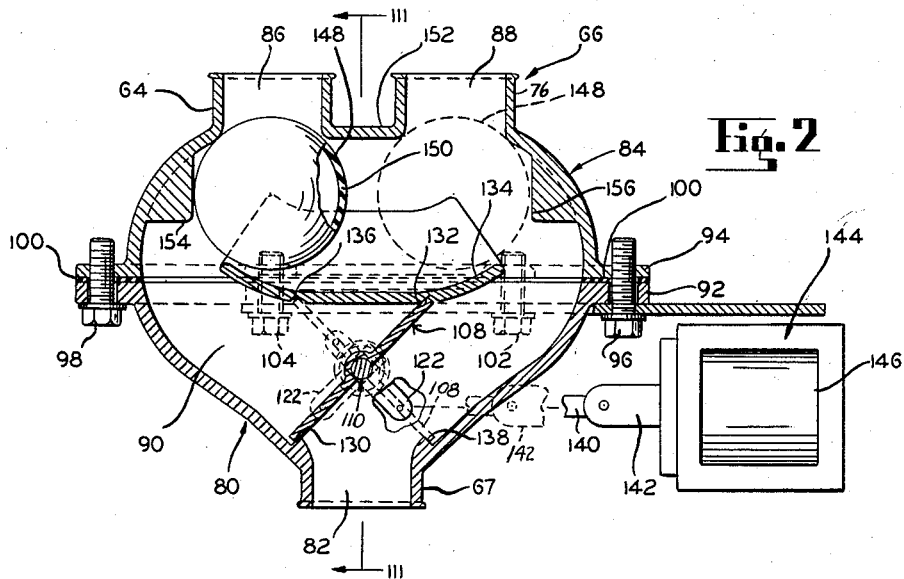
Fig. 2
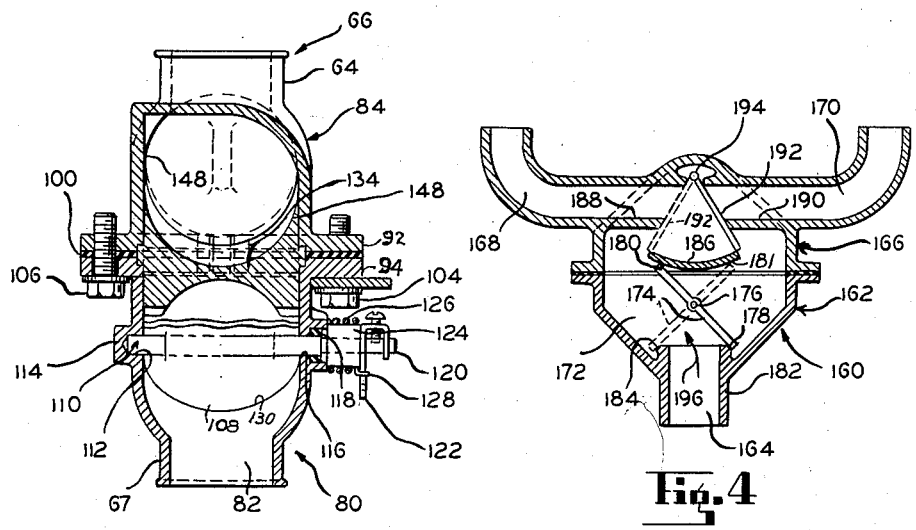
Fig. 3
Fig. 4
INVENTOR.
JACK F. CLEARMAN
BY
ATTORNEYS

United States Patent Office 2,918,927
Patented Dec. 29, 1959

---

2,918,927

TRANSFER VALVE

Jack F. Clearman, St. Joseph, Mich., assignor to Whirlpool Corporation, a corporation of Delaware Application May 10, 1956, Serial No. 584,091

15 Claims. (Cl. 134—200)

The present invention relates to improvements in fluid flow control valves of a type for selectively diverting and controlling a flow of fluid from an inlet line to one of a pair of outlet lines.

An object of the present invention is to provide a fluid diverting valve for use in a dishwasher which is capable of selectively diverting a flow of heated washing water to any chosen one of a plurality of dishwashing water distributers.

Another object of the invention is to provide a fluid diverting valve which is well suited to recirculating the washing water and is self-cleaning so as to insure positive closing of the valve and to prevent leakage from foreign materials entering the valve and depositing on the seating surfaces.

Another object of the invention is to provide an improved fluid diverting valve which is simple and inexpensive in construction and in which there need be no highly machined or finished parts.

Another object of the invention is to provide an improved valve in which the parts are easily and readily assembled during manufacture and in which the valve can be easily disassembled for repair.

Another object of the invention is to provide a valve capable of diverting a flow of fluid to a plurality of distributing points wherein a very small amount of power is required to change the setting of the valve.

Another object of the invention is to provide a valve for diverting a flow of fluid to a plurality of distributing points and which is self-cleaning.

In accordance with the foregoing objectives the present invention contemplates the provision of a valve which receives a flow of pressurized fluid and is capable of being set to distribute the flow to a plurality of distribution points, such as is required in distributing a flow of heated water in a dishwashing system to a selected one of a number of spray jets. One embodiment of the invention is provided with a hollow valve casing formed of two parts secured together, with one of said parts having an inlet port and the other of said parts having a pair of outlet ports and the ports communicating through the hollow housing. Between the outlet ports is positioned a freely movable blocking member which will be engaged by the stream of water moving through the valve casing to block either of the outlet ports. A wall extends across the hollow housing above the blocking member to direct the flow of water laterally against the blocking member. A deflector member in the form of a butterfly valve is positioned adjacent the inlet port to divert the flow of fluid toward either one of the outlet ports to force the blocking member against the remaining outlet port.

Other objects and advantages will become more apparent by reference to the following specification and claims taken in connection with the appended drawings in which like numerals indicate like parts and in which:

Figure 2 is an enlarged vertical sectional view taken through the body of the valve to show the details of the interior construction thereof;

Figure 3 is a vertical sectional view taken along lines III—III of Figure 2; and Figure 4 is a vertical sectional view taken through a structure illustrating an alternative embodiment of the invention.

Figure 1:
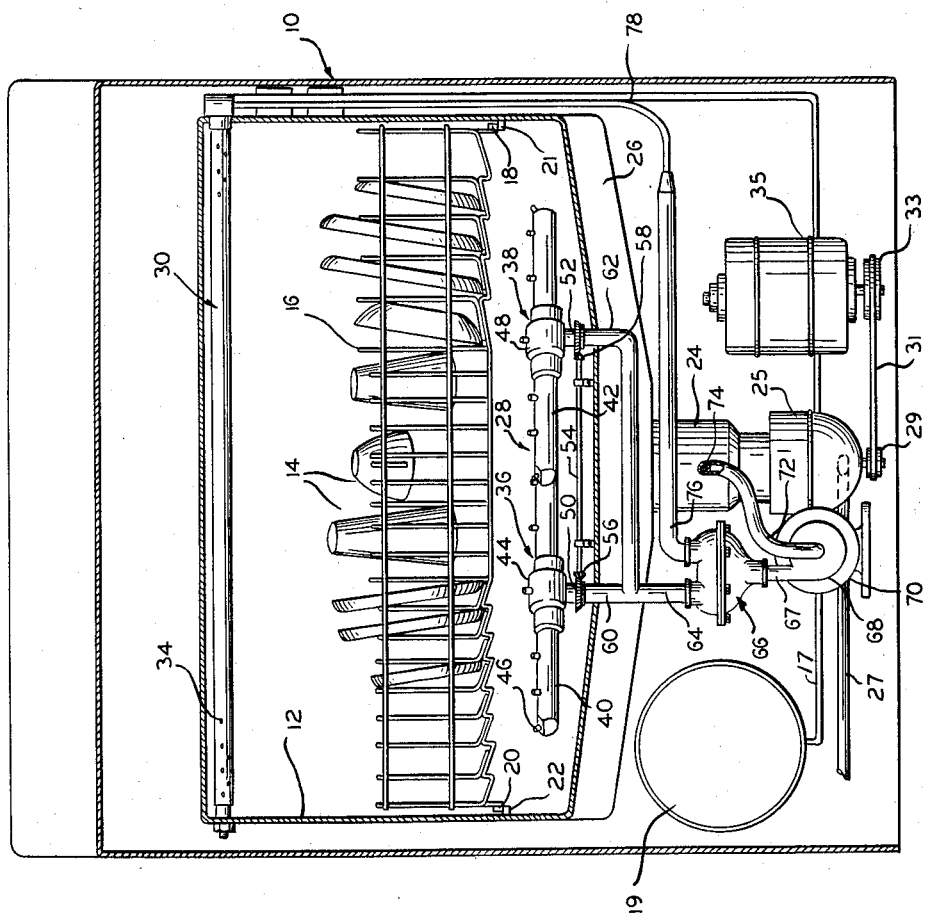
Figure 1 is a vertical sectional view taken through a dishwashing machine to illustrate a dishwasher combined with the diverter valve.

The present drawings and description illustrate preferred embodiments of the invention and it will be understood that certain features, advantages and objectives of the invention may be obtained in usages in other embodiments and that the valve may take other forms and be used in other combinations in addition to the dishwashing arrangement shown in Figure 1.

In Figure 1, the dishwasher is shown housed within a cabinet 10. The cabinet is provided with an access door, not shown, for insertion and removal of the dishes for washing and the details of the cabinet and certain features of the washer need not be shown in complete detail since they may take various forms known to the art and therefore need only be shown sufficiently to permit an understanding of the present invention.

Within the cabinet 10 is a tank 12 defining a treatment zone for the dishes illustrated generally at 14. The dishes are suitably supported in a rack 16 which may be fixed within the tank 12 or may be slidably positioned therein to be rolled in and out for loading and unloading.

For sliding the rack out from the tank 12 the tank is provided with the access door (not shown) and carries rollers 18 and 20 which ride on tracks 21 and 22 secured to the inner walls of the tank 12. The tracks 21 and 22 are provided with stops at the end to prevent overtravel of the rack.

At the base of the tank, which is waterproof to hold the washing fluid therein, is a sump chamber 24. The sump 24 holds the washing fluid for the dishes and the fluid drains from the dishes to be recirculated and sprayed against the dishes during the washing operation. As the dishes are held in the treatment zone within the tank 12, water is first placed within the tank through a suitable inlet pipe, not shown, to run down into the sump 24. For purposes of draining the water into the sump the bottom surface 26 of the tank 12 is inclined so that the fluid will run down into the sump.

The sump, during normal operation supplies water to be recirculated through the spray units 28 and 30 by means of the pump 68. When a portion of the operation is completed, the sump 24 is drained and filled with fresh water. For draining, the sump leads to a drain pump 25 operated by a motor 35 connected thereto by a V-belt 31 trained over the motor pulley 33 and over the pump pulley 29. The waste fluid is pumped out through a drain pipe 27 which connects to the household drain.

When the sump is properly filled with water of the right temperature, and a proper amount of detergent or soap has been added to the water, it is forcibly directed against the dishes by conveniently positioned jets within the tank 12. The present embodiment is shown with a first spray unit 28 at the bottom of the tank and a second jet spray unit 30 at the top of the tank. In accordance with the present invention, the washing fluid is pressurized and selectively directed to either of the spray units 28 or 30. The spray units are critically positioned so that they may operate to direct water against the dishes at various times during the time cycle of the operation of the machine. For example, the machine may go through a succession of washing and rinsing cycles wherein the wash water contains soap or detergent and the rinse water is clear. The wash water and rinse water may also be of a different temperature in the successive rinsings and washings so as to accomplish the desired result. According to the present invention the fluid for these various treatments are obtained from the same source as pumped by pressure pump 68. The valve of the present invention controls the flow of water from the pressure pump and directs the flow to the desired spray.

The upper spray tube 30 extends across the top of the dishwasher in the form of a spray tube 30 having a plurality of jet openings or nozzles 34 formed in the tube to project streams of water downwardly toward the dishes 14. These jets or nozzles 34 and the other features of the spray system are not shown in detail since nozzles of any type may be used in order to spray the dishes from the upper area of the tank.

In order to direct sprays of water against the bottom of the dishes, the lower spray unit 28 is comprised of a pair of rotating spray arms 36 and 38. Each spray arm consists of a pair of horizontal hollow pipes, such as 40 or 42 with their inner ends mounted in hollow central hubs 44 and 48. The hubs are rotatably mounted on the water supply conduits 60 and 62. Each of the pipes 40 and 42 possesses a plurality of upwardly extending jets such as shown at 46 in the arm 40. These jets direct a spray of water upwardly against the bottom of the dishes and thus insure that the dishes will be subjected to a spray of washing fluid from all directions. Although the jets 46 extend primarily upwardly, certain of the jets or nozzles are set at an angle to the spray arm so that the reaction force of the water emitting from the nozzles will cause the arms to rotate. Each of the spray arms 36 and 38 thus acts as a reaction spray arm and rotates during the time the water emits from the nozzles. It will be noted that the two arms are positioned in overlapping relation so that the area between them will always be covered by one of the arms.

To permit concurrent overlapping relation in the same horizontal plane, some form of synchronization must be provided between the arms. To provide this synchronization, each of the hubs 44 and 48 carries a bevel gear with the bevel gear 50 being attached to the hub 44 and the bevel gear 52 being attached to the hub 48. A cross shaft 54 extends rotatably between the bevel gears and carries at its ends small pinion bevel gears 56 and 58 which are in mesh with the bevel gears 50 and 52, respectively, to insure synchronized rotation between the rotating reaction spray arms. Thus, as the arms rotate, due to the reaction of the water emitting from the nozzles, they will overlap at their central common areas without interfering.

The hubs carrying the rotatable spray arms are rotatably mounted at the tops of water distribution conduits 60 and 62. These conduits or pipes feed water under pressure to the rotating spray arms in order to direct it upwardly against the dishes stacked in the rack 16. The pipes 60 and 62 connect to a common lead pipe 64 which connects to one of the outlet ports of the valve 66, the valve being shown in detail in its preferred form in Figures 2 and 3.

The outlet pipe 64 for the valve receives fluid channeled through the valve body from the inlet pipe 67 which connects to the discharge of a pump 68. The pump may be of the common centrifugal type and is driven by a motor 70 suitably mounted within the dishwasher cabinet. The eye of the pump is supplied liquid through an intake pipe 72, which leads to the base of the sump 24, and a screen 74 is positioned over the inlet of the pipe 72 so that waste food materials washed from the dishes will not be again forced through the pump and upwardly through the spray arms to clog the nozzles.

The valve 66 is operative to direct water either through the outlet pipe 64 or through the outlet pipe 76. Outlet pipe 76 connects to a small conduit 78 which leads upwardly to the tube 30 supplying the nozzles 34 at the top of the dishwasher. In order to insure that full pressure will be available to obtain an optimum washing effect on the dishes, the valve 66 is utilized to divert water either to the sprays at the top of the washer or to the sprays at the base of the dishwasher to obtain top pressure for both operations. Further, in some instances it may be desirable to utilize either the top or the bottom spray for different purposes at different times, such as using one spray unit for one type of rinse and using the other spray unit for another type of rinse.

The diverter valve 66, however, is preferably controlled by a time sequence control means which also determines the sequence of operation of the automatic dishwasher. The control means will automatically control the setting of the valve and determine whether water is being distributed from the pump through the conduit 76 to be directed to the upper spray tube 30 or to the lower spray unit 28. If desired, the inlet pipe 67 leading to the valve may also be connected to the household water supply and the diverter valve 66 can then also control the flow of water from this source.

Water for filling the tank 12 is obtained from a household water supply and may also be obtained from a supply tank 19 which is provided with a heater to provide very hot water to make available water of the desired temperature. The supply tank has a pipe 17 leading therefrom and connected to the water inlet (not shown) leading to the interior of the dishwasher tank 12. The tank 19 is supplied with water from the household line and may be connected either to the hot or cold water supply. If desired the pipe 17 may also be connected to the household line and a special control valve provided to obtain water directly from the household line and furnish it to the dishwashing tank 12.

The preferred form of the valve, shown at 66 in Fig. 1, is illustrated in details in Figs. 2 and 3. The operating parts of the valve are enclosed by a valve housing or casing which is comprised of two hollowed sections with the first section 80, shown as the lower one-half in Figs. 2 and 3, being provided with an inlet port 82 which is formed by the conduit 67. The second housing section 84, shown as the upper section in Figs. 2 and 3, is provided with a first and second outlet port 86 and 88 formed by the conduits 64 and 76. The inlet port 82 and outlet ports 86 and 88 communicate with each other through the hollow interior 90 of the housing. The housing sections 80 and 84 are provided with flanges 92 and 94, respectively, and the flange of the first lower housing section 80 is shown drilled with holes to pass studs, such as 96, 98, 104 and 106, and the flange 94 on the second upper housing section contains threaded holes so that the studs may be screwed into the holes to hold the housing sections together. Between the flanges 92 and 94, of the first and second sections of the valve housing, there is placed a gasket 100, shaped to the size of the valve housing to prevent leakage of fluid from the interior 90 of the valve. The flanges 92 and 94 may be continuous around the valve or may have projections or ears through which the connecting bolts 96 and 98 will be placed.

A deflector blade or butterfly valve 108 is pivotally mounted in the first lower section of the housing to deflect the flow of water entering the inlet port 82 to either of the outlet ports 86 or 88. The deflector blade 108 is secured to a pivotal pin 110 which is mounted at one end in a bearing hole 112 drilled in a small boss 114 provided in the housing. The other end of the pin 110 extends through an opening 116 in the side of the housing to project outwardly beyond the face of the housing. A packing 118 is provided to prevent the leakage of water or fluid out through the bearing hole 116. Connected to the reduced portion 120 of the pivotal pin 110 is an operating crank arm 122. A hub member or sleeve 124 is slipped over the reduced end 120 of the pivotal pin and is located between the crank arm 122 and the side of the housing. The hub carries a torsion spring 126 which is anchored at one end to the housing and which has a bent end 128 which projects into a hole in the crank arm. The torsion spring urges the crank arm to pivot the deflector blade 108 to the solid line position of Figure 2. The blade has limited pivotal movement in this direction since one edge of the blade will strike a shoulder 130 within the housing and the other edge of the blade will strike a shoulder 132 formed in the retaining wall 134.

When the deflector blade 108 is moved to its other position, which is shown in the dotted line position of Figure 2, the edges of the deflector blade will strike shoulders 136 in the retaining wall 134 and 138 in the housing. Thus, the pivotal movement of the valve is limited between its two positions.

To move the valve between its first and second positions, a linking arm 140 connects between the crank arm 122 and the armature 142 of a solenoid 144. The solenoid includes a coil 146 which has electrical leads (not shown) connecting to a suitable source of electricity which is controlled by a switch operated by the time cycling device that controls the dishwasher. If the valve is to be used in a different environment any suitable source of electricity can control the solenoid. When the solenoid is energized, the armature 142 moves to the right, as shown in the solid line position of Figure 2, to pull the crank arm 122 and move the deflector blade 108 to the solid line position shown in Figure 2. This movement is against the action of the torsion spring 126 which normally holds the deflector blade in the dotted line position. When the solenoid is deenergized, the spring will take over and move the valve blade 108 to the dotted line position.

As will be noted from the drawing of Figure 2, when the deflector blade 108 is in the solid line position, fluid entering the inlet port 82 will flow to the right of the valve housing around the right end of the retainer wall 134 and toward the outlet port 88. When the deflector blade 108 is swung to the dotted line position, the fluid entering the valve through the inlet port 82 is deflected around the opposite end of the retainer wall 134 toward the outlet port 86.

In order to insure that all of the fluid will pass out through the outlet port toward which it is directed, a movable blocking member is provided, shown in the form of a spherical ball 148.

If the valve is to be used in an appliance having a low flow rate, the ball 148 is preferably hollow, having a thin side wall 150 so as to be light in weight and insure rapid movement between its solid line posiiton over the port 86 and its dotted line position over the port 88. If the flow conditions are favorable, the ball 148 may be a solid sphere of rubber, nylon, plastic, or any other suitable material. The retainer wall 134 extending across the hollow housing provides a raceway for the ball in its movement between the two outlet ports. The ends of the retainer wall 134 are curved upwardly to provide an even track for the ball to move back and forth in its movement and the wall is set a sufficient distance from the port separating wall 152 of the housing, extending between the two outlet ports 88 and 86, to provide free movement of the ball in its movement. Metal bosses 154 and 156 are provided within the housing to stop the spherical blocking member 148 at the two extreme ends of its raceway and to guide it in its position against the ports where it seats to completely block the outlet openings.

Thus, it will be seen in the operation of the valve that when the deflector blade 108 is in the position shown in the solid line drawing of Figure 2, the fluid flows in through the inlet port 82 and out of the outlet port 88, forcing the spherical blocking member 148 firmly against its seat to close the outlet port 86.

When the flow of fluid is to be diverted through the other outlet port 86, the solenoid is deenergized to swing the deflector blade 108 to the dotted line position of Figure 2. The fluid entering the inlet port 82 will immediately be diverted to the other side of the hollow housing to flow against the side of the spherical ball 148 and cause it to rapidly shift to the other side of the housing and seat against the opening to close the port 88. The ball will immediately seat since it will be stopped in its travel by striking the boss 156. In its movement between the two ports the ball will rotate as it moves against the surface of the retaining wall 134, and it will therefore dislodge any foreign materials which may have adhered to its surface during the time it was seated to close the port 86. This is extremely important in use with such equipment as dishwashers wherein particles of food and the like may adhere to the valve surfaces and must be dislodged so that they will not remain between the seating surfaces of the valve to cause the valve to leak.

In the form of the valve 160, shown in Figure 4, the valve member includes a housing having a first lower hollow housing section 162 provided with an inlet port 164 and a second mating hollow housing section 166 having first and second outlet ports 168 and 170. The inlet port 164 is in communication with the two outlet ports 168 and 170 through the hollow interior 172 of the valve housing. Pivotally mounted within the first lower section 162 of the valve housing is a valve deflector blade 174 mounted on a pivotal pin 176 extending across the housing and suitably supported therein for free pivotal movement. The pin at one end is connected to a crank arm which is not shown, but which is similar to that provided with the valve shown in Figures 2 and 3.

Through operation of the crank arm, the valve deflector blade 174 is moved either to the solid line position shown in Figure 4 or to the dotted line position. In the solid line position, the edges of the blade engage a stop 178 and another stop 180 to hold it in the solid line position. The stop 178 is formed as part of the annulus 182 which forms the inlet conduit for the valve housing. On the other side of the annulus is another stop 184 which the deflector blade 174 engages when shifted to its dotted line position. The stop 180 is formed by the lower surface of the wall or partition 186. This partition also forms a stop 181 for the other edge of the blade when moved to its dotted line position, as shown in Figure 4.

The outlet port 168 is formed by a tubular conduit 188 extending into the upper portion 166 of the valve housing. The outlet port 170 also is formed by a tubular conduit 190 projecting into the section 166 of the valve housing. Between the tubular conduits 188 and 190 is positioned a floating vane 192 which is pivotally mounted at its base 194 in the valve housing. The partition 186 insures that the fluid passing through the interior of the valve housing will engage only one lateral face of the floating vane 192 and swing it to close the outlet port through which the fluid is not flowing.

In operation, when the deflector blade 174 is in the solid line position of Figure 4, the fluid will enter the inlet port 164 to force the vane 192 to the solid line position shown, and thus permit the fluid to flow out of the outlet port 168. If the blade 174 is moved to the dotted line position of Figure 4, the fluid entering the inlet port 164 will engage the other face of the vane 192 swinging it to the dotted line position and the outlet port 168 will thus be blocked forcing the fluid to flow out of the outlet port 170. The inner ends of the tubular conduits 188 and 190 are beveled next to the vane 192 to permit the blocking vane 192 to lie flat against the end of the blocked conduit and to seal it completely. The vane is freely movable and will be self-cleaning in its swinging movement between its two blocking positions.

Thus, it will be seen that I have provided an improved dishwashing system and a valve for use therein which accomplishes the objectives and advantages hereinbefore set forth. It will be recognized that the valve is extremely simple in construction and may be economically manufactured and assembled and requires no precise machining as is the case with many of the valves heretofore used.

The valve is extremely well adapted to use in mechanisms such as a dishwasher in that it is self-cleaning and will prevent foreign material such as food particles adhering to the mating valve surface and will thus avoid such particles from holding the valve open.

The valve is self-opening and uses the pressure of the water to operate the blocking member and close the outlet port when the blade is set to the desired position. The deflector blade is balanced and requires a little force to operate and can be actuated by a simple small solenoid, as is illustrated in the preferred embodiment shown, or by other motor means.

I have, in the drawings and specification, presented a detailed disclosure of the preferred embodiments of my invention, but it is to be understood that I do not intend to limit the invention to the specific forms disclosed but intend to cover all modifications, changes and alternative constructions and methods falling within the scope of the principles taught by my invention.

I claim as my invention:

1. In a machine for washing dishes, the combination of, a housing enclosing a dish treatment zone in which the dishes are cleaned, a first water spray positioned in one location within the housing, a second water spray positioned in a different location in said housing, first and second water conduits leading to said first and second sprays, a pressure means for supplying water under pressure to said sprays, a diverter valve having an inlet port and first and second outlet ports, said inlet port connected to said pressure means and said first and second outlet ports connected respectively to said first and second conduits, said valve being selectively operable to direct water from either the first port or the second port to direct water either to the first or second spray, control means operatively connected to operate the valve to direct water toward either the first or second outlet port, and means automatically operative to close one of the outlet ports in response to the flow of water caused by the operation of said control means to direct water toward the other of said port.

2. In a machine for washing dishes, the combination of, a housing enclosing a dish treatment zone in which the dishes are cleaned, a first water spray positioned in one location within the housing, a second water spray positioned in a different location in said housing, first and second water conduits leading to said first and second sprays, a pressure means for supplying water under pressure to said sprays, a valve body having an inlet port and first and second outlet ports, said inlet port connected to said pressure means and said first and second outlet ports connected respectively to said first and second conduits, a deflector member in said valve body positioned adjacent said inlet port and movable between a first and a second position to deflect stream of water from said inlet port toward either the first or second outlet ports, a movable flow responsive valve member in said valve body between said first and second outlet ports and movable by the flow of liquid toward one of said outlet ports to automatically close the other of said outlet ports, and control means operatively connected to the deflector to control the position thereof and direct water out of either the first or second outlet port.

3. In a machine for washing dishes, the combination of, a housing enclosing a dish treatment zone in which the dishes are cleaned, a first water spray positioned in one location within the housing, a second water spray positioned in a different location in said housing, first and second water conduits leading to said first and second sprays, a pressure means for supplying water under pressure to said sprays, a diverter valve having an inlet port and first and second outlet ports, said inlet port connected to said pressure means and said first and second outlet ports connected respectively to said first and second conduits, said valve being selectively operable to direct water from either the first port or the second port to direct water either to the first or second spray, said valve having a housing with a hollow interior in communication with said ports, a deflector member positioned adjacent said inlet port and movable between a first and a second position to deflect the stream of water toward either the first or second outlet ports, a spherical ball positioned adjacent the outlet ports and freely movable against the first or second port to effectively block said port when the water is deflected toward the other port, and control means operatively connected to the deflector to control the position thereof and direct water out of either the first or second outlet port.

4. In a machine for washing dishes, the combination of, a housing enclosing a dish treatment zone in which the dishes are cleaned, a first water spray positioned in one location within the housing, a second water spray positioned in a different location in said housing, first and second water conduits leading to said first and second sprays, a pressure means for supplying water under pressure to said sprays, a valve body having an inlet portion with an inlet port and an outlet portion having first and second outlet ports, said inlet port connected to said pressure means and said first and second outlet ports connected respectively to said first and second conduits, a deflector member in said inlet portion movable between a first and a second position to deflect the stream of water toward either the first or second outlet ports, a blocking vane pivotally supported in said outlet portion and responsive to the flow of liquid to move against the first or second outlet port for blocking said port when the water is deflected toward the other port, and control means operatively connected to the deflector to control the position thereof and direct water out of either the first or second outlet port.

5. A diverter valve for directing the flow of fluid in an appliance comprising a valve housing having an inlet and first and second outlets, a deflector member in said inlet movable between a first and a second position to deflect the stream of water toward either the first or second outlets, actuating means connected to the deflector to control the position thereof and move it between said first and second positions, and a flow responsive valve member adapted to close one of said outlet ports in response to liquid flow directed towards the other of said outlets.

6. A diverter valve for directing the flow of fluid in an appliance comprising a valve housing having an inlet port and first and second outlet ports, and having a hollow interior through which said ports communicate and being in communication with said ports, a deflector member positioned adjacent said inlet port and movable between a first and a second position to deflect the stream of water toward either the first or second outlet ports, actuating means connected to the deflector to control the position thereof and move it between said first and second position, and a flow responsive blocking member engaged by the stream of water effectively blocking one of said outlet ports when the water is deflected toward the other outlet port, said blocking member having a plurality of seating surfaces and adapted to change position in moving between the first and second outlet ports to dislodge foreign materials which may be carried against the valve surface by the stream of fluid.

7. A diverter valve for directing the flow of fluid in an appliance comprising a valve housing having an inlet port and first and second outlet ports, and having a hollow interior through which said ports communicate, a deflector means adjacent the inlet port and movable between first and second fluid diverting positions, means connected to the deflector means to control the position thereof and move it between said first and second positions, and a spherical ball positioned adjacent the outlet ports and freely movable against the first or second port to effectively block said port when the water is deflected toward the other port, said ball rotating in changing positions to dislodge foreign materials which may be carried against the valve surface by the stream of fluid.

8. A diverter valve for directing the flow of fluid in an appliance comprising a valve housing having an inlet port and first and second outlet ports, and having a hollow interior through which said ports communicate, a deflector member located adjacent the inlet port, means connected to the deflector to control the position thereof and move it between first and second fluid deflection positions, a flow responsive blocking member engaged by the stream of water and alternately forced against the first or second outlet port to effectively block said port by the water deflected toward the other port, and a retaining wall extending between the deflector member and blocking member and defining a path for the blocking member to move between said first and second ports.

9. In a valve mechanism, a housing having an inlet opening and first and second outlet openings, said housing having a hollow interior through which said openings communicate, fluid directing means adjacent said inlet opening, said directing means being movable between a first and second position to direct fluid flow through said housing toward either the first or second outlet opening, means connected to said directing means to control the position thereof, and sealing means within said housing movably responsive to flow of fluid therethrough and adapted to seal the first or second outlet opening thereby to provide for fluid flow through the other of said outlet openings.

10. A diverter valve for directing the flow of fluid in an appliance comprising, a valve housing having an inlet port and first and second outlet ports, and having a hollow interior through which said ports communicate, a fluid deflector positioned adjacent the inlet port, means connected to the deflector to control the position thereof and move it between first and second positions, a spherical ball positioned adjacent the outlet ports and freely movable against the first or second port to effectively block said port when the water is deflected toward the other port, and a raceway extending across the valve housing for containing the ball and permitting free movement between the outlet ports.

11. A diverter valve for directing the flow of fluid in an appliance comprising a valve housing comprising a pair of hollow sections separably secured together with a first section having an inlet port and the second section having a pair of outlet ports, a deflector blade pivotally mounted in the first section adjacent said inlet port and movable between a first and a second position to deflect the stream of water toward either the first or second outlet port, means connected to said deflector blade to control the position thereof and move it between said first and second positions, and a flow responsive blocking member engaged by the stream of water and alternately forced against the first or second outlet port to effectively block said port by the water deflected toward the other port.

12. A diverter valve for directing the flow of fluid in an appliance comprising a valve housing having an inlet port and first and second outlet ports, and having a hollow interior through which said ports communicate, a deflector member positioned adjacent said inlet port and movable between a first and a second position to deflect the stream of water toward either the first or second outlet ports, means connected to the deflector to control the position thereof and move it between said first and second position, and a spherical ball positioned adjacent the outlet ports and freely movable against the first or second port to effectively block said port when the water is deflected toward the other port, said spherical ball being freely movable to insure rapid response to the fluid and rotational movement to dislodge foreign materials.

13. A diverter valve for directing the flow of fluid in an appliance comprising a valve housing having an inlet port and first and second outlet ports, and having a hollow interior through which said ports communicate, a deflector member positioned adjacent said inlet port and movable between a first and a second position to deflect the stream of water toward either the first or second outlet ports, means connected to the deflector to control the position thereof and move it between said first and second position, and a blocking vane pivotally supported within the housing between the outlet ports with the free end directed toward the inlet port, said vane being movable in response to liquid flow and being alternately forced against the first or second outlet port to effectively block said port by the water deflected toward the other port.

14. A diverter valve for directing the flow of fluid in an appliance comprising a valve housing having an inlet port and first and second outlet ports, and having a hollow interior through which said ports communicate, a deflector member positioned adjacent said inlet port and movable between a first and a second position to deflect the stream of water toward either the first or second outlet ports, means connected to the deflector to control the position thereof and move it between said first and second position, a blocking vane pivotally supported within the housing between the outlet ports with the free end directed toward the inlet port, said vane being movable in response to liquid flow and being alternately forced against the first or second outlet port to effectively block said port by the water deflected toward the other port, and a wall extending across the valve housing between the vane and the inlet port for directing a flow of fluid around the ends of the wall to engage the vane from a lateral direction.

15. In a valve mechanism, a housing having an inlet opening and first and second outlet openings, said housing having a hollow interior through which said openings communicate, sealing means within said housing, said sealing means being movable between said first and second outlet openings responsive to fluid flow through said housing, and fluid directing means within said housing, said directing means being selectively operable to cause said sealing means to move from a sealing position with respect to one of said outlet openings into a sealing position with respect to the other of said outlet openings.

References Cited in the file of this patent

UNITED STATES PATENTS

| | | |
|---|---|---|
| 83,808 | Van Norman | Nov. 3, 1868 |
| 287,033 | Lewis | Oct. 23, 1883 |
| 1,080,027 | Van Sinderen | Dec. 2, 1913 |
| 1,654,355 | Webb | Dec. 27, 1927 |
| 1,675,231 | Stoke | June 26, 1928 |
| 1,897,821 | Poli | Feb. 14, 1933 |
| 2,471,506 | Wiswall | May 31, 1949 |
| 2,575,493 | Hilliker | Nov. 20, 1951 |
| 2,682,880 | Ozmina | July 6, 1954 |

FOREIGN PATENTS

| | | |
|---|---|---|
| 53,083 | Germany | Aug. 20, 1890 |